(12) United States Patent
Komatsu et al.

(10) Patent No.: US 8,519,042 B2
(45) Date of Patent: Aug. 27, 2013

(54) THERMAL CONDUCTIVE RESIN COMPOSITION

(75) Inventors: Shintaro Komatsu, Tsukuba (JP); Mitsuo Maeda, Tsukuba (JP); Hiroshi Harada, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 14 days.

(21) Appl. No.: 11/878,216

(22) Filed: Jul. 23, 2007

(65) Prior Publication Data

US 2008/0021146 A1 Jan. 24, 2008

(30) Foreign Application Priority Data

Jul. 24, 2006 (JP) .................................. 2006-200375
Nov. 8, 2006 (JP) .................................. 2006-302533

(51) Int. Cl.
*C04B 26/06* (2006.01)

(52) U.S. Cl.
USPC .......................................................... 524/437

(58) Field of Classification Search
USPC .......................................................... 524/437
See application file for complete search history.

(56) References Cited

U.S. PATENT DOCUMENTS

| | | | | |
|---|---|---|---|---|
| 4,293,513 A | * | 10/1981 | Langley et al. | 264/630 |
| 4,349,637 A | * | 9/1982 | Miedaner et al. | 501/126 |
| 5,013,773 A | * | 5/1991 | Nomura et al. | 523/222 |
| 5,385,780 A | * | 1/1995 | Lee | 428/325 |
| 5,830,566 A | * | 11/1998 | Kimura et al. | 428/323 |
| 6,010,656 A | * | 1/2000 | Nomura et al. | 264/255 |
| 6,120,894 A | | 9/2000 | Yamamoto et al. | |
| 2003/0047712 A1 | * | 3/2003 | Maeda et al. | 252/299.64 |

FOREIGN PATENT DOCUMENTS

| | | | |
|---|---|---|---|
| EP | 0 704 414 A1 | * | 4/1996 |
| JP | 61221216 A | | 10/1986 |
| JP | 62-100577 A | | 5/1987 |
| JP | 3-212454 A | | 9/1991 |
| JP | 4-198266 A | | 7/1992 |
| JP | 6144999 A | | 5/1994 |
| JP | 8-91954 A | | 4/1996 |
| JP | 8-283456 A | | 10/1996 |
| JP | 2001172479 A | | 6/2001 |
| JP | 2005146124 A | | 6/2005 |

OTHER PUBLICATIONS

Japanese Office Action issued on Sep. 11, 2012 by the Japanese Patent Office in Japanese Patent Application No. 2006-302533.
U.S. Appl. No. 11/723,439, filed Mar. 20, 2007.

* cited by examiner

*Primary Examiner* — Doris Lee
(74) *Attorney, Agent, or Firm* — Sughrue Mion, PLLC

(57) ABSTRACT

A thermal-conductive resin composition which can provide an molded article excellent in thermal conductivity and/or mechanical strength is provided. The resin composition comprising a resin selected from a thermosetting resin and a thermoplastic resin; a granule having a number average particle diameter of 0.5 to 5 mm and comprising alumina fibers with a number average fiber diameter of 1 to 50 μm; and an alumina fine particle.

15 Claims, No Drawings

THERMAL CONDUCTIVE RESIN COMPOSITION

BACKGROUND OF THE INVENTION

1. Field of the Invention

The present invention relates to a thermal conductive resin composition which can provide an molded article excellent in thermal conductivity and/or mechanical strength.

2. Description of the Related Art

Recently, especially in the field of electric and electronic parts, resin materials having high thermal conductivity have been demanded. For example, it has been proposed to conduct a method for imparting high thermal conductivity to resin materials by highly filling a spherical filler comprising a highly thermal-conductive material such as copper, aluminium and aluminium oxide is widely used (e.g., see, JP-A-62-100577; JP-A-04-178421; and JP-A-05-86246). Thermoplastic resins having high thermal conductivity by being filled with fibrous fillers comprising the materials exemplified above have also been reported (e.g., see, JP-A-03-212454; and JP-A-09-157403, corresponding to U.S. Pat. No. 6,120,894). Furthermore, compositions obtained by mixing fibrous fillers and spherical fillers with thermoplastic resins (e.g., see, JP-A-04-198266; and JP-A-08-283456).

However, techniques disclosed in the above patents cannot provide sufficiently high thermal conductivity and/or mechanical strength to resin materials, and some resin materials are difficult to be applied to members involved in electric and electronic parts because of high electrically conductive fillers. In addition, in terms of the composition disclosed in JP-A-08-283456, the molded article obtained from the composition containing aluminium nitride as fillers is relatively expensive due to high cost of the fillers.

SUMMARY OF THE INVENTION

The present invention provides a resin composition which can provide an molded article having high thermal conductivity and high mechanical strength with lower cost.

As the result of extensive investigation, the present inventors have accomplished the present invention.

That is, the present invention provides a resin composition comprising:

(A) a resin selected from a thermosetting resin and a thermoplastic resin;

(B) a granule having a number average particle diameter of 0.5 to 5 mm and comprising alumina fibers with a number average fiber diameter of 1 to 50 μm; and (C) an alumina fine particle.

Further, the present invention provides a molded article obtainable by molding the resin composition.

Using the above-mentioned resin composition, a molded article with high thermal conductivity and high mechanical strength can be obtained with lower cost. From the resin composition, members having high thermal conductivity, particularly members involved in electric and electronic parts can be easily obtained.

DETAIL DESCRIPTION OF PREFERRED EMBODIMENTS

A resin composition in the present invention comprises (A) a resin selected from a thermosetting resin and a thermoplastic resin;

(B) a granule having a number average particle diameter of 0.5 to 5 mm and comprising alumina fibers with a number average fiber diameter of 1 to 50 μm; and (C) an alumina fine particle.

The granule (B) used in the present invention can be obtained by granulating alumina fibers with a number average fiber diameter of 1 to 50 μm.

The alumina fibers may mainly contain alumina. Here, "alumina fibers mainly containing alumina" means that the alumina fibers contain 50% by weight or more of alumina (i.e., aluminum oxide ($Al_2O_3$)). The alumina content in the alumina fibers mainly containing alumina is preferably 50% by weight or more, more preferably 70% by weight or more, and most preferably 90% by weight or more, on the basis of the alumina fibers mainly containing alumina. The alumina fibers may contain ingredients other than alumina, such as silica ($SiO_2$).

The number average fiber diameter of the alumina fibers is 1 to 50 μm, preferably 1 to 30 μm, and more preferably 1 to 30 μm, and most preferably 1 to 20 μm. When the alumina fibers having a number average fiber diameter of from 1 to 50 μm are used, there are advantages in that granulating processability is good and that it is difficult to have the fibers cut by themselves during a granulating process. When the alumina fibers which have been cut too much are used, the resulting resin composition tends to have lower thermal conductivity.

The length of the alumina fibers is not specifically limited. Among fibrous fillers generally commercially available, an alumina fiber having 100 μm to 100 mm length is easily available and a fiber within the range may be used. The length thereof is preferably 100 μm to 80 mm, and more preferably 150 μm to 60 mm. The length of the fiber within the range described above is preferable because granulating processability becomes good.

Specific examples of the alumina fibers easily commercially available include ALTEX (manufactured by Sumitomo Chemical Co., Ltd.), Denka Alcen (manufactured by Denki Kagaku Kogyo K.K.), MAFTEC bulk fiber (manufactured by Mitsubishi Chemical Functional Products, Inc.) and Saffil alumina fiber (manufactured by Saffil Japan Limited).

The alumina fiber preferably has a bulk density of 0.2 to 1.0 $g/cm^3$ determined according to JIS K5101-12. Use of such a fiber provides advantages of easier granule production which may be conducted in the present invention and more improved thermal conductivity of a molded article obtained from the resulting resin composition. The bulk density is more preferably 0.2 to 0.5 $g/cm^3$, and still more preferably 0.2 to 0.4 $g/cm^3$, and most preferably 0.2 to 0.35 $g/cm^3$. The alumina fiber of such a bulk density may be in the form of fluff, which is granulated as described below into a granule having improved operability in preparation of the thermal conductive resin composition of the present invention.

The granule used in the present invention can be produced from the above-mentioned alumina fibers by granulation. The method for granulation may be a known method, including stirring granulation, vibration granulation, crushing granulation and the like. In the present invention, stirring granulation is particularly preferable. Examples of a mixer used in the stirring granulation include a tumbler, a Nauta Mixer, a ribbon type blender and a Henschel mixer. From the viewpoint of short time processing, the Henschel mixer is preferable.

The number average particle diameter of the granule is 0.5 mm to 5 mm, more preferably, 1 mm to 2 mm, and most preferably 1 mm to 1.5 mm. A granule having a number average particle diameter of not less than 0.5 mm has good workability, particularly in preparing the resin composition, while a granule having a number average particle diameter of not more than 5 mm has good dispersibility in fused resin in preparing a molded article by melting the resin composition, both of which are preferable due to good moldability.

Such a number average particle diameter can be controlled by stirring conditions in granulation, such as a stirring rate and a stirring period. The stirring conditions, which may be varied according to a mixer used, may be optimized through preliminary tests.

After the granulation, particle size classification for removing the smaller and the larger particles may be carried out obtain the granule having the number average particle diameter of 0.5 to 5 mm. Examples of the particle size classification include wet particle size classifications using such as a hydrocyclon classifier, a siphon sizer, a rake classifier and a spiral classifier and dry particle size classifications using such as a cyclone classifier, an inertial classifier and a sieve.

For the granulation while stirring, any known method can be used, including a method of using the stirring granulator for granulating a powder as described above, a method of charging fiber fibers in an adequate solvent and stirring and drying the fiber, and a method of stirring a fiber with a mixer or the like with spraying an adequate solvent and drying the fiber, for example. A method of stirring an aggregate of alumina fibers with a mixer or the like with spraying an adequate solvent and drying may also be possible. In those methods, a solvent such as water, organic solvents and mixtures thereof may be used. The solvent is preferably water or a mixed solvent of water with an organic solvent (which mainly consists of water), and is most preferably water.

In the granulation while stirring (herein after referred to as "stirring granulation") in the present invention, the solvent may further comprise a sizing agent.

Any sizing agent can be used without specific limitation. Specific examples of the sizing agent include silane and/or titanate coupling agents.

Examples of the silane coupling agent include γ-mercaptopropyltrimethoxysilane, 2-styrylethyltrimethoxysilane, N-β-(aminoethyl)-γ-aminopropyltrimethoxysilane, β-(3,4-epoxycyclohexyl)ethyltrimethoxysilane, γ-glycidoxypropyltrimethoxysilane, phenyltrimethoxysilane, methyldimethoxysilane, which may be used alone or in combination of two or more kinds.

Examples of the titanate coupling agent include isopropyl tri-isostearoyl titanate, isopropyl trioctanoyl titanate, isopropyl tri(dioctyl pyrophosphate)titanate, isopropyl tridimethacryl isostearoyl titanate, isopropyl tri(N,N-diaminoethyl)titanate, isopropyl tridodecylbenzenesulfonyl titanate, isopropyl isostearoyl diacryl titanate, isopropyl tri(dioctyl phosphate)titanate, isopropyl tricumylphenyl titanate, tetraisopropyl bis(dioctyl phosphate)titanate, tetraoctyl bis(didodecyl phosphate)titanate, tetra(2,2-diallyloxymethyl-1-butyl)bis(ditridecyl)phosphate titanate, bis(dioctyl pyrophosphate)oxyacetate titanate and bis(dioctyl pyrophosphate)ethylene titanate, which may be used alone or in combination of two or more kinds. The silane coupling agent and the titanate coupling agent may be used together.

When the coupling agent is used, the amount of the coupling agent may be not more than 5 parts by weight, and is preferably not more than 2 parts by weight to 100 parts by weight on the basis of the alumina fibers. The granule in the present invention is improved little in thermal conductivity with the sizing agent such as the coupling agent. Too large an amount of the coupling agent tends to reduce thermal conductivity and mechanical properties of the resulting resin composition, that is unfavorable, but a small amount of the coupling agent may be used, because the granule obtained from a alumina fibers treated with the small amount of the coupling agent has increased compatibility with a resin to be mixed and the resin has an improved feeding property in molding the resulting thermal conductive resin composition.

The granule in the present invention may also be prepared directly by using a granulator without the solvent and the sizing agent, in order to increase of productivity. Such a preparing method is preferable from the viewpoint of less tendency of fibers constructing the granule to be broken after granulation, as well as an advantage of the method of eliminating a drying step and the like.

The granule (B) in the present invention can be obtained as described above, which may be obtained after being subjected to the particle size classification described above to adjust the number average particle diameter of the granule within the range of the present invention.

The resin composition of the present invention comprises an alumina fine particle (C).

The alumina fine particle (C) preferably comprises α-alumina, the aluminum oxide ($Al_2O_3$) content of which may be 95% by weight or more. The alumina fine particle (C) may have a number average particle diameter of from 0.1 to 100 µm. The higher content of aluminum oxide in the alumina fine particle (C) is preferred in view of thermal conductivity. The content of aluminum oxide in the alumina fine particle (C) is preferably 99% by weight or more, and is more preferably 99.5% by weight or more. When the alumina fine particle (C) has the number average particle diameter of from 0.1 to 100 µm, the dispersibility of the particle becomes good in fused resin in preparing a molded article by melting the resulting resin composition, which results in good moldability. The average particle diameter of the alumina fine particle (C) is preferably in the range of from 0.1 to 70 µm, more preferably in the range of from 0.1 to 50 µm, and most preferably in the range of from 0.1 to 20 µm. Here, the average particle diameter is an average particle diameter of 50 to 100 particles, each diameter of which has been obtained by image analysis of pictures of the particles taken with a scanning electron microscopy. The alumina fine particle (C) preferably has a narrow particle size distribution. Specifically, when an accumulative particle size distribution of the alumina fine particle (C) is measured, the ratio ($D_{90}/D_{10}$) of 90% accumulative particle diameter ($D_{90}$), which is obtained by accumulating the particles from small particle diameter side, to 10% accumulative particle diameter ($D_{10}$) is preferably 7 or smaller. The values of $D_{90}$ and $D_{10}$ can be obtained, for example, by a laser diffraction-scattering method using Mastersizer (manufactured by Marburn Co., Ltd).

The shape of the alumina fine particle (C) is not limited, and is preferably a spherical shape, a nearly spherical shape, polyhedron shape or the like. When the longer axis length (L: µm) and shorter axis length (S: µm) of the alumina fine particle (C) are measured, the alumina fine particle (C) preferably has the L/S ratio of from 1 to 3. In addition, it is preferred that the alumina fine particle (C) substantially has no crushing surface.

The alumina fine particle (C) may be commercially available alumina particle. Examples of the commercially available alumina fine particle include Sumicorandom manufactured by Sumitomo Chemical Co., Ltd., the alumina fine particle provided by Showa Denko K. K., the alumina fine particle provided by Nippon Light Metal CO., Ltd, and the like.

The resin composition of the present invention comprises a resin (A) selected from a thermosetting resin and a thermoplastic resin.

Examples of the thermosetting resin include phenol resins, unsaturated polyesters, epoxy resins, vinyl ester resins, alkyd resins, acrylic resins, melamine resins, xylene resins, guanamine resins, diallyl phthalate resins, allyl ester resins, furan resins, imide resins, urethane resins, urea resins and diene resins, which may be used alone or in combination of two or more kinds.

Among them, preferred are phenol resins, unsaturated polyesters, epoxy resins, vinyl ester resins, allyl ester resins, diene resins, and particularly preferred are epoxy resins from the viewpoint of good heat resistance after being cured. Conception of said epoxy resins includes epoxy resins obtained typically by glycidyl-etherifying a phenolic hydroxyl group of a polyhydric phenol such as bisphenol A, bisphenol S, bisphenol F and triphenoxymethane with epihalohydrin and the like and oligomerizing the resultant compound and epoxy resins obtained by glycidyl-etherifying a polymer having a plurality of phenolic hydroxyl groups such as novolac resins and polyhydroxystyrene with epihalohydrin and the like. Epoxy resins that are easily commercially available (e.g., available from Japan Epoxy Resin Co., Ltd.) may also be used.

Into the resin composition having the thermosetting resin, may further be added a curing agent and/or a curing accelerator, which may be widely used to easily cause curing reaction. Examples of the curing agent and/or curing accelerator include radical-generating catalysts such as peroxides and azo compounds for thermosetting resins having a carbon-carbon unsaturated bond as a reactive group for curing such as unsaturated polyester, vinyl ester resins, allyl ester resins and diene resins and amine compounds such as hexamethylenetetramine for novolac resins. In the case of epoxy resins, a curing agent such as an acid, amine and acid anhydride may be used together with a compound such as a phosphorous compound, a quaternary ammonium salt, imidazole, a trifluoroborane complex and a transition metal acetylacetonate as a curing accelerator.

The thermoplastic resin which may be used in the resin composition of the present invention has no specific limitation, and is preferably a resin moldable at a molding temperature of 200 to 450° C. Examples of the thermoplastic resin include polyolefin, polystyrene, polyamide, halogenated vinyl resins, polyacetal, saturated polyester, polycarbonate, polyallylsulfone, polyallylketone, polyphenylene ether, poly(phenylene sulfide) or polyphenylene sulfide sulfone, polyarylate, polyamide, liquid crystal polyester and fluorine resins. At least one thermoplastic resin selected from the group described above may be used alone, or a polymer alloy consisting of two or more of the thermoplastic resins selected from the group may be used.

Among the thermoplastic resins, preferred are liquid crystal polyester, polyether sulfone, polyarylate, poly(phenylene sulfide), polyamide 4/6 and polyamide 6T, which are excellent in heat resistance, more preferred are polyphenylene sulfide and liquid crystal polyester, which are particularly excellent in heat resistance, and further more preferred is liquid crystal polyester, from the viewpoint of excellent thin-wall moldability. The thermoplastic resin excellent in thin-wall moldability is preferably used to form a member used in electric and electronic parts.

Polyphenylene sulfide may be a resin comprising mainly a structural unit represented by the following formula (10):

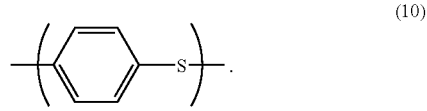

The polyphenylene sulfide can be produced, for example, by a reaction of a halogen-substituted aromatic compound with alkali sulfide (as disclosed in U.S. Pat. No. 2,513,188 and JP-B-S44-27671), a condensation reaction of thiophenol in the presence of an alkali catalyst or copper salt and the like (as disclosed in U.S. Pat. No. 3,274,165 and the like), or a condensation reaction of an aromatic compound with sulfur chloride in the presence of a Lewis acid catalyst (as disclosed in JP-B-S46-27255). Polyphenylene sulfide easily commercially available (e.g., available from Dainippon Ink and Chemicals Incorporated, for example) may also be used.

As mentioned above, a liquid crystal polyester is also preferably used as the thermoplastic resin.

The liquid crystal polyester may be referred to as a thermotropic liquid crystal polymer, and forms a melted body exhibiting optical anisotropy at temperatures not more than 450° C. The preferable liquid crystal polyester has a flow-beginning temperature of not less than 280° C.

Specific examples of the liquid crystal polyester include:

(1) those obtained by polymerization among aromatic hydroxycarboxylic acids, aromatic dicarboxylic acids and aromatic diols;

(2) those obtained by polymerization of different types of aromatic hydroxycarboxylic acids;

(3) those obtained by polymerization of aromatic dicarboxylic acids with aromatic diols; and (4) those obtained by reaction of crystalline polyester such as poly(ethylene terephthalate) with aromatic hydroxycarboxylic acids.

Ester-forming derivatives of those aromatic hydroxycarboxylic acids, aromatic dicarboxylic acids and aromatic diols are preferably used instead of those acids and diols, because the liquid crystal polyester is more easily prepared therefrom.

In the case of aromatic hydroxycarboxylic acids and aromatic dicarboxylic acids intramolecularly having a carboxyl group, examples of the ester-forming derivative include those obtained by conversion of the carboxylic acid group to a highly reactive group such as an acid halogen group and an acid anhydride, and esters with alcohols and ethylene glycol that will form polyesters by transesterification. In the case of aromatic hydroxycarboxylic acids and aromatic diols intramolecularly having a phenolic hydroxyl group, examples of the ester-forming derivative include esters of the phenolic hydroxyl group with lower carboxylic acids that will form polyesters by transesterification.

Further, those aromatic hydroxycarboxylic acids, aromatic dicarboxylic acids and aromatic diols may have substituents such as a halogen atom, an alkyl group such as a methyl group and an ethyl group and an aryl group such as a phenyl group on an aromatic ring of those acids and diols to the extent that the ester-forming properties thereof are not disturbed.

Examples of the structural unit in the liquid crystal polyester of the present invention include, but are not limited to:

structural units derived from aromatic hydroxycarboxylic acids:

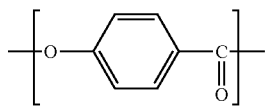
(A₁)

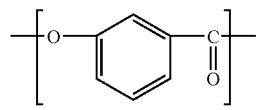

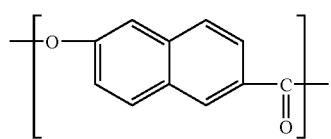
(A₂)

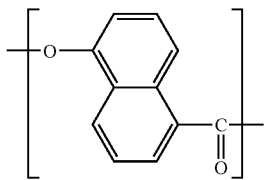

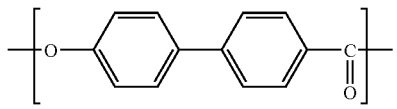

wherein aromatic rings of those structural units may be substituted with a halogen atom, an alkyl group or an aryl group;

structural units derived from aromatic dicarboxylic acids:

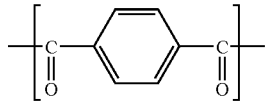
(B₁)

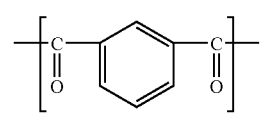
(B₂)

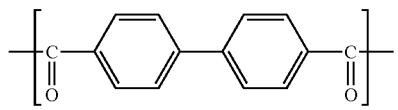

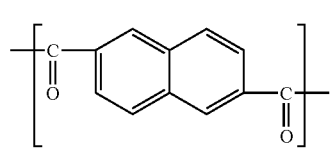
(B₃)

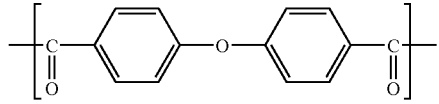

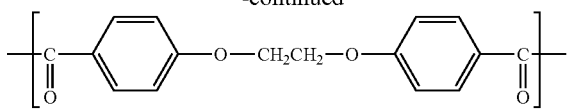

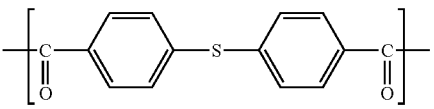

wherein aromatic rings of those structural units may be substituted with a halogen atom, an alkyl group or an aryl group; and structural units derived from aromatic diols:

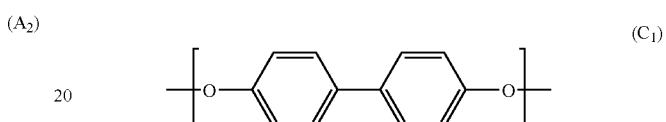
(C₁)

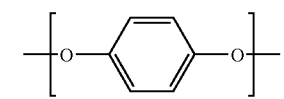
(C₂)

(C₃)

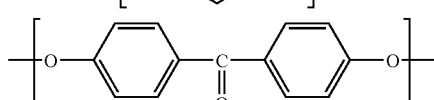

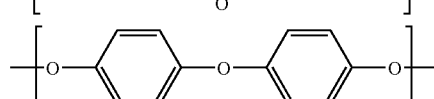

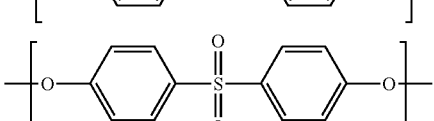

wherein aromatic rings of those structural units may be substituted with a halogen atom, an alkyl group or an aryl group.

Specific examples of the combination of structural units to form the liquid crystal polyester include the following (a) to (f):

(a): a combination of (A₁), (B₁) and (C₁), or (A₁), (B₁), (B₂) and (C₁);

(b): a combination of (A₂), (B₃) and (C₂), or (A₂), (B₁), (B₃) and (C₂);

(c): a combination of (A₁) and (A₂);

(d): a combination obtained from the combination of structural units (a) by replacing a part or whole of (A₁) with (A₂);

(e): a combination obtained from the combination of structural units (a) by replacing a part or whole of (B₁) with (B₃);

(f): a combination obtained from the combination of structural units (a) by replacing a part or whole of (C₁) with (C₃);

(g): a combination obtained from the combination of structural units (b) by replacing a part or whole of (A₂) with (A₁); and (h): a combination obtained by adding structural units (B₁) and (C₂) to the combination of structural units (c).

Liquid crystal polyesters of (a) and (b), which are of primal structures, are respectively exemplified in JP-B-S47-47870 and JP-B-S63-3888 (which are incorporated herein).

From the viewpoints of the balance of heat resistance, mechanical properties and processability, particularly preferred liquid crystal polyester comprises the structural unit represented by the formula ($A_1$) in an amount of at least 30% by mol of the total structural units that construct the liquid crystal polyester.

As for a method for preparing the liquid crystal polyester, a known method, for example, described in JP-A-2002-146003 is applicable. The exemplified method comprises: subjecting the monomer (aromatic hydroxycarboxylic acids, aromatic dicarboxylic acids, aromatic diols or ester-forming derivatives thereof) to melt polycondensation to give a relatively lower molecular weight aromatic liquid crystal polyester (hereinafter, abbreviated as a "prepolymer"), making the prepolymer into a powder, and heating the powder to cause solid phase polymerization. By the solid phase polymerization, polymerization can be further progressed, resulting in polymers of higher molecular weight.

From the viewpoint of development of liquid crystallinity, the liquid crystal polyester used in the present invention preferably comprises:

30 to 80% by mol of structural units derived from p-hydroxybenzoic acid and/or 2-hydroxy-6-naphthoic acid;

10 to 35% by mol of structural units derived from at least one compound selected from the group consisting of hydroquinone and 4,4'-dihydroxybiphenyl; and 10 to 35% by mol of structural units derived from at least one compound selected from the group consisting of terephthalic and isophthalic acids, on the basis of 100% by mol of the total amounts of the structural units that constructing the liquid crystal polyester.

As mentioned above, the present invention provides a molded article with high thermal conductivity and high mechanical strength from a resin composition of the present invention, the composition comprising the resin (A) selected from a thermosetting resin and a thermoplastic resin, the granule (B) and the alumina fine particle (C).

The thermoplastic resin is preferred in view of good moldability to obtain parts with intricate shapes. Therefore, the thermoplastic resin or a mixture of the thermoplastic resin with a thermosetting resin is preferably used in the present invention especially when the good moldability is demanded. Using such a resin containing the thermoplastic resin, the resin composition of the present invention may be molded by a method such as an extrusion molding, an injection molding, a press molding and an inflation molding to obtain a molded article of the present invention.

On the other hand, when the molded article with high heat resistance is demanded, a thermosetting resin is preferably used as the resin (A) in a resin composition of the present invention. When the thermosetting resin is used, an molded article can be obtained by a method in which an appropriate mold is charged with the resulting resin composition, followed by a heat treatment; a press molding method of pressing the resin composition while heating; or the like.

When the thermosetting resin is used as the resin (A), the resin composition may comprise 10 to 300 parts by volume of the granule (B) and 1 to 300 parts by volume of the alumina fine particle (C) on the basis of 100 parts by volume of the thermosetting resin. In this case, the total amount of the granule (B) and the alumina fine particle (C) is preferably in the range of from 20 to 600 parts by volume, more preferably in the range of from 30 to 500 parts by volume, and most preferably in the range of from 20 to 600 parts by volume.

On the other hand, when the thermoplastic resin is used as the resin (A), the resin composition may comprise 5 to 150 parts by volume of the granule (B) and 1 to 120 parts by volume of the alumina fine particle (C) on the basis of 100 parts by volume of the thermoplastic resin. When the ratio of the granule (B) to the alumina fine particle (C) is within the range described above, a molded article obtained therefrom has a high thermal conductivity and mechanical strength.

Moreover, when the thermoplastic resin is used, the resin composition preferably comprises 10 to 130 parts by volume of the granule (B), and more preferably comprises 10 to 120 parts by volume of the granule (B), on the basis of 100 parts by volume of the thermoplastic resin. When the ratio of the granule (B) is within such a range, a molded article obtained therefrom has a more excellent thermal conductivity and mechanical strength. In addition, the resin composition preferably comprises 5 to 120 parts by volume of the alumina fine particle (C), and more preferably comprises 8 to 110 parts by volume of the alumina fine particle (C), on the basis of 100 parts by volume of the thermoplastic resin. When the ratio of the alumina fine particle (C) is within such a range, a molded article with high thermal conductivity is obtained, and also moldability is more improved and therefore, a production of the molded article is easily conducted.

In the present invention, one or more of commonly used additives may be added within the range of not impairing the object of the present invention. Examples of the additives include fillers such as glass fiber, mold release improvers such as fluorine resin and metallic soaps, colorants such as dyes and pigments, antioxidants, heat stabilizers, UV absorbers, antistatic agents, surfactants, and the like. One or more of additives having an external lubricating effect such as higher fatty acids, higher fatty acid esters, higher fatty acid metal salts and fluorocarbon surfactants may also be added.

A method for preparing a resin composition of the present invention is not specifically limited. The method preferably comprises: mixing the resin (A), the granule (B) and the alumina fine particle (C) using a Henschel mixer, tumbler, or the like, and then melt kneading using an extruder is preferable. By such a melt kneading, the resin composition may be formed to have a pellet shape.

The resin composition may be molded to provide a molded article thereof by selecting an appropriate molding method depending on the shape of the aimed molded article. The method of molding is not limited. When the resin composition comprising the thermoplastic resin as the resin (A) is used, an injection molding is preferably selected. The molded article obtained by the injection molding can have an intricate shape which may have a thin part therein. The molded article obtained from the resin composition of the present invention by, for example, the injection molding is useful as a member for electronic parts, particularly a member required to have thermal conductivity.

The molded article can be used in various fields.

Examples of use of the molded article is as follows:

Electric parts such as cases of electric and electronic equipments, power generator, electric motor, electric transmission, current transmission, voltage regulator, commutator, voltage inverter, power junction, switch, electric current breaker, cabinet, socket, relay case;

electronic parts such as sensor, LED lamp, lamp socket, lamp reflector, lamp housing, connector, coil bobbin, capacitor, oscillator, various terminals, transformer, plug, printed-circuit board, magnetic head base, power module, parts of hard disc drive, DVD parts such as optical pickup, parts related personal computer;

insulated materials of electric components such as semiconductor device, sealing resin of coil;

parts of optical instrument such as camera; and heat-generated parts such as bearing, parts of automobile, motorbike, train, airplane, ship and bicycle.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2006-200375 filed on Jul. 24, 2006 and the Japanese Patent Application No. 2006-302533 filed on Nov. 8, 2006, both of them including specification, claims and summary, are incorporated herein by reference in their entirety.

EXAMPLES

The present invention is described in more detail by following Examples, which should not be construed as a limitation upon the scope of the present invention.

In Examples and Comparative Examples below, the following alumina fine particles were used.

Alumina Particles 1: Advanced alumina AA-18, manufactured by Sumitomo Chemical Co., Ltd., having a number average particle diameter of 18 μm and an alumina content of 99.6% by weight;

Alumina Particles 2: Advanced alumina AA-1.5, manufactured by Sumitomo Chemical Co., Ltd., having a number average particle diameter of 1.5 μm and an alumina content of 99.6% by weight; and Alumina Particles 3: Advanced alumina AA-03, manufactured by Sumitomo Chemical Co., Ltd., having a number average particle diameter of 0.3 μm and an alumina content of 99.6% by weight.

Preparation Example 1

Preparation of Granule 1

Alumina fibers (Denka Alcen, manufactured by Denki Kagaku Kogyo K.K., alumina content: 100% by weight, number average fiber diameter: 3.2 μm, bulk density: 0.28 g/cm$^3$) was stirred and granulated in a Henschel mixer (Supermixer G100, manufactured by KAWATAMFG Co., Ltd.) to give Granule 1. Granule 1 had a number average particle diameter of 1.0 mm as determined by an optical microscope.

Preparation Example 2

Preparation of Granule 2

A mixture of 100 parts by weight of alumina fiber (Denka Alcen, manufactured by Denki Kagaku Kogyo K.K., alumina content: 97% by weight, number average fiber diameter: 3.2 μm, bulk density: 0.27 g/cm$^3$) and 30 parts by weight of water was stirred and granulated in a Henschel mixer (Supermixer G100, manufactured by KAWATAMFG Co., Ltd.) to give Granule 2. Granule 2 had a number average particle diameter of 1.3 mm as determined by a scanning electron microscopy.

Preparation Example 3

Preparation of Liquid Crystal Polyester

A reactor equipped with a stirring apparatus, a torque meter, a nitrogen gas inlet pipe, a thermometer and a reflux condenser was charged with 994.5 g (7.2 mol) of p-hydroxybenzoic acid, 446.9 g (2.4 mol) of 4,4'-dihydroxybiphenyl, 299.0 g (1.8 mol) of terephthalic acid, 99.7 g (0.6 mol) of isophthalic acid and 1347.6 g (13.2 mol) of acetic anhydride. The inside of the reactor was fully substituted with nitrogen gas. The reaction mixture was heated to 150° C. over 30 minutes under nitrogen gas stream, and refluxed for 1 hour at the temperature.

Then, with removing acetic acid as a by-product and unreacted acetic anhydride, the reaction mixture was heated to 320° C. over 2 hours and 50 minutes. The reaction was considered to reach the reaction end when torque of the reaction mixture increased, and thus a prepolymer was obtained.

The resultant prepolymer was cooled to room temperature, crushed with a roughly crushing machine, and then, under nitrogen atmosphere, heated from room temperature to 250° C. over 1 hour, heated from 250° C. to 285° C. over 5 hours, and kept at 285° C. for 3 hours to progress solid phase polymerization. The resultant liquid crystal polyester had a flow-beginning temperature of 327° C. The liquid crystal polyester thus obtained is referred to as LCP1.

Examples 1 to 6 and Comparative Examples 1 to 7

Granules 1 and 2 (obtained in Preparation Examples 1 and 2), the liquid crystal polyester (obtained in Preparation Example 3) and Alumina Particles described above, each amount of which are shown in Table 1 were mixed to prepare Resin compositions of Examples 1 to 6 and of Comparative Examples 1 to 7, which were then kneaded at 340° C. with a parallel twin screw extruder (PCM-30, Ikegai Tekko K.K.) to give pellets. Each of the resultant pellets was injection-molded with an injection molding machine (model PS40E5ASE, Nissei Plastic Industrial Co., Ltd.) under the conditions of a cylinder temperature of 350° C. and a mold temperature of 130° C. to give a molded rectangular block of 126 mm×12 mm×6 mm, respectively. In each Example and Comparative Examples 1 to 7, the obtained molded block was cut into a plate of 1 mm thickness (MD) vertical to the longest axis of the molded block, and a plate of 1 mm thickness (TD) parallel to the longest axis of the molded block, which were used as a sample for thermal conductivity evaluation. Using the samples, heat diffusion rate were measured with a laser flash thermal constant analyzer (TC-7000, manufactured by ULVAC-RIKO, Inc.). In the measurement, specific heat were obtained with a DSC (DSC7, manufactured by PERKINELMER), and specific gravity were obtained with an automatic specific gravity measuring instrument (ASG-320K, Kanto Measure K.K.). Thermal conductivity of the samples was determined by multiplying heat diffusion rate by specific heat and specific gravity.

Also, ASTM4-type tensile dumbbells were obtained from the resin compositions to measure tensile properties of the resin compositions in the same manner as in ASTM D638.

On the other hand, using the molded rectangular block of 126 mm×12 mm×6 mm, flexural properties of each block were measured in the same manner as in ASTM D790.

These measurement values are shown in Tables 1 and 2.

TABLE 1

|  | Example 1 | Example 2 | Example 3 | Example 4 | Example 5 | Example 6 |
| --- | --- | --- | --- | --- | --- | --- |
| LCP 1 (part by volume) | 100 | 100 | 100 | 100 | 100 | 100 |
| Granule 1 (part by volume) | 90 | 90 | 10 | 0 | 0 | 0 |
| Granule 2 (part by volume) | 0 | 0 | 0 | 90 | 100 | 90 |
| Alumina Particles 1 (part by volume) | 10 | 0 | 0 | 0 | 0 | 0 |
| Alumina Particles 2 (part by volume) | 0 | 10 | 90 | 10 | 22 | 0 |
| Alumina Particles 3 (part by volume) | 0 | 0 | 0 | 0 | 0 | 10 |
| Thermal conductivity (MD) (W/mK) | 4.3 | 4.8 | 5.5 | 4.3 | 3.5 | 2.3 |
| Thermal conductivity (TD) (W/mK) | 4.1 | 5.0 | 3.9 | 1.7 | 3.0 | 2.9 |
| Tensile strength (MPa) | 83 | 71 | 70 | 90 | 86 | 86 |
| Tensile modulus (MPa) | 11700 | 10900 | 6900 | 11200 | 12700 | 12000 |
| Flexural strength (MPa) | 131 | 108 | 101 | 141 | 115 | 127 |
| Flexural modulus (MPa) | 29600 | 28100 | 17500 | 31400 | 31900 | 29700 |

TABLE 2

|  | Comparative Example 1 | Comparative Example 2 | Comparative Example 3 | Comparative Example 4 | Comparative Example 5 | Comparative Example 6 | Comparative Example 7 |
| --- | --- | --- | --- | --- | --- | --- | --- |
| LCP 1 (part by volume) | 100 | 100 | 100 | 100 | 100 | 100 | 100 |
| Granule 1 (part by volume) | 100 | 0 | 0 | 0 | 0 | 0 | 0 |
| Granule 2 (part by volume) | 0 | 100 | 0 | 0 | 0 | 0 | 0 |
| Alumina Particles 1 (part by volume) | 0 | 0 | 100 | 122 | 0 | 0 | 0 |
| Alumina Particles 2 (part by volume) | 0 | 0 | 0 | 0 | 100 | 122 | 0 |
| Alumina Particles 3 (part by volume) | 0 | 0 | 0 | 0 | 0 | 0 | 100 |
| Thermal conductivity (MD) (W/mK) | 3.5 | 2.7 | 2.2 | 2.4 | 3.5 | 2.3 | Impossible to mold |
| Thermal conductivity (TD) (W/mK) | 3.0 | 2.9 | 1.7 | 2.0 | 3.0 | 2.9 | — |
| Tensile strength (MPa) | 59 | 64 | 52 | 49 | 63 | 56 | — |
| Tensile modulus (MPa) | 10500 | 9300 | 7600 | 8200 | 7900 | 9400 | — |
| Flexural strength (MPa) | 65 | 75 | 85 | 81 | 93 | 82 | — |
| Flexural modulus (MPa) | 23900 | 25200 | 13200 | 16300 | 13000 | 16600 | — |

Example 7

Polyphenylene sulfide PPS1 (T-3G, manufactured by Dainippon Ink and Chemicals Incorporated), and Granule 1 (obtained in Preparation Example 1) and Alumina Particles 1, each amount of which are shown in Table 3, were mixed to prepare Resin composition of Example 7, which were then kneaded at 300° C. with a parallel twin-screw extruder (PCM-30, Ikegai Tekko K.K.) to give a pellet. The resultant pellet was injection-molded with an injection molding machine (model PS40E5ASE, Nissei Plastic Industrial Co., Ltd.) under the conditions of a cylinder temperature of 350° C. and a mold temperature of 130° C. to give a molded rectangular block of 126 mm×12 mm×6 mm. The obtained molded block was cut into a plate of 1 mm thickness (MD) vertical to the longest axis of the molded block, and a plate of 1 mm thickness (TD) parallel to the longest axis of the molded block, which were used as samples for measurements. Using the samples and the resin composition, heat diffusion rate, thermal conductivity and flexural properties were measured in the same manners as in Examples 1 to 6 and Comparative Examples 1 to 7. The measurement values are shown in Table 3.

TABLE 3

|  | Example 7 |
| --- | --- |
| PPS1 (part by volume) | 100 |
| Granule 1 (part by volume) | 90 |
| Alumina Particles 1 (part by volume) | 10 |
| Thermal conductivity (MD) (W/mK) | 3.4 |
| Thermal conductivity (TD) (W/mK) | 1.9 |
| Flexural strength (MPa) | 155 |
| Flexural modulus (MPa) | 36000 |

Example 8 and Comparative Example 8

Each of liquid epoxy resins of Example 8 and Comparative Example 8 was prepared from bisphenol-A epoxy resin (828, manufactured by Japan Epoxy Resin Co., Ltd.) by adding 90 parts by weight of acid anhydride (Rikacid MT-500TZ, manufactured by New Japan Chemical Co., Ltd.) as a curing agent and 0.9 parts by weight of 2-ethyl-4-methylimidazole (2E4MZ, manufactured by Shikoku Chemicals Corporation) as a curing accelerator per 100 parts by weight of bisphenol-A epoxy resin. The liquid epoxy resin was mixed with Granule 1 obtained in Preparation Example 1 and Alumina Particles 1 in a composition respectively shown in Table 4 to give each of liquid epoxy resin composition of Example 8 and Comparative Example 8. Each of the resin composition was injected into a mold, allowed to cure for 2 hours at 100° C. and for 5 hours at 130° C. in a hot air drier to produce a molded resin. Each of the resultant molded resin was cut into a plate of 1 mm thickness, which was used as a sample for thermal conductivity evaluation. In the case of the epoxy resin, since a molded article was obtained by injection into a mold, there is no distinction of MD and TD as an injection-molded article has and no directional property of thermal conductivity in the molded article. Using each sample and each resin composition, heat diffusion rate and thermal conductivity were measured in the same manners as in Examples 1 to 5, provided that in the case of the epoxy resin, thermal conductivity was determined in only one direction, since it has isotropic thermal conductivity. The measurement value of thermal conductivity is shown in Table 4.

TABLE 4

|  | Example 8 | Comparative Example 8 |
| --- | --- | --- |
| Epoxy resin(part by volume) | 100 | 100 |
| Granule 1 (part by volume) | 55 | 0 |
| Alumina Particles 1 (part by volume) | 6 | 0 |
| Thermal conductivity (MD) (W/mK) | 2.0 | 0.8 |

What is claimed is:

1. A resin composition comprising:
    (A) a resin selected from the group consisting of a thermosetting resin and a thermoplastic resin;
    (B) a granule having a number average particle diameter of 0.5 to 5 mm and comprising fibers with a bulk density of greater than 0.2 to 1 g/cm$^3$, wherein the fibers comprise alumina fibers with a number average fiber diameter of 1 to 50 μm; and
    (C) an alumina fine particle.

2. The resin composition according to claim 1, wherein the alumina fine particle (C) has a number average particle diameter of 0.1 to 100 μm.

3. The resin composition according to claim 1, wherein the resin (A) is a thermoplastic resin, and the resin composition comprises 5 to 150 parts by volume of the granule (B) and 1 to 120 parts by volume of the alumina fine particle (C) on the basis of 100 parts by volume of the thermoplastic resin.

4. The resin composition according to claim 1, wherein the fibers have a bulk density of greater than 0.2 to 0.5 g/cm$^3$.

5. The resin composition according to claim 1, wherein the fibers have a bulk density of greater than 0.2 to 0.4 g/cm$^3$.

6. The resin composition according to claim 1, wherein the fibers have a bulk density of greater than 0.2 to 0.35 g/cm$^3$.

7. The resin composition according to claim 1, wherein the fibers have a bulk density of greater than 0.27 to 0.5 g/cm$^3$.

8. The resin composition according to claim 1, wherein the granule (B) is a granule obtained by granulating the fibers while stirring.

9. The resin composition according to claim 1, wherein the resin (A) is a thermosetting resin, and the resin composition comprises 10 to 300 parts by volume of the granule (B) and 1 to 300 parts by volume of the alumina fine particle (C) on the basis of 100 parts by volume of the thermosetting resin.

10. The resin composition according to claim 1, wherein the resin is a thermoplastic resin.

11. The resin composition according to claim 10, wherein the thermoplastic resin is a polyphenylene sulfide.

12. The resin composition according to claim 10, wherein the thermoplastic resin is a liquid crystal polyester.

13. The resin composition according to claim 12, wherein the liquid crystal polyester has a flow-beginning temperature of not less than 280° C.

14. The resin composition according to claim 12 or 13, wherein the liquid crystal polyester comprises:
    30 to 80% by mol of structural unit derived from p-hydroxybenzoic acid and/or 2-hydroxy-6-naphthoic acid;
    10 to 35% by mol of structural unit derived from hydroquinone and/or 4,4'-dihydroxybiphenyl; and
    10 to 35% by mol of structural unit derived from at least one compound selected from the group consisting of terephthalic acid, isophthalic acid and 2,6-naphthalenedicarboxylic acid;
    on the basis of 100% by mol of the total amounts of the structural units that constructing the liquid crystal polyester.

15. A molded article obtainable by molding the resin composition according to any of claims 1, 9, 12 and 13.

* * * * *